(12) United States Patent
Xia et al.

(10) Patent No.: US 10,834,543 B2
(45) Date of Patent: Nov. 10, 2020

(54) CREATING A SOCIAL GROUP WITH MOBILE PHONE VIBRATION

(71) Applicant: INTERNATIONAL BUSINESS MACHINES CORPORATION, Armonk, NY (US)

(72) Inventors: Yin Xia, Beijing (CN); Lu Fu, Ningbo (CN); Zhang Yu Lin, Ningbo (CN); Lei Pan, Ningbo (CN); Jie Hu, Ningbo (CN); Bin Xu, Ningbo (CN); Xiao Lin Sun, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/199,861

(22) Filed: Nov. 26, 2018

(65) Prior Publication Data

US 2020/0169851 A1    May 28, 2020

(51) Int. Cl.
*H04W 4/08* (2009.01)
*H04M 1/725* (2006.01)
(Continued)

(52) U.S. Cl.
CPC .............. *H04W 4/08* (2013.01); *B06B 1/02* (2013.01); *G06Q 50/01* (2013.01); *H04B 11/00* (2013.01);
(Continued)

(58) Field of Classification Search
CPC ... H04W 4/08; H04W 12/04031; H04W 8/05; H04B 11/00; H04L 12/1822; H04M 1/72519; H06B 1/02; H06Q 50/01
(Continued)

(56) References Cited

U.S. PATENT DOCUMENTS 6,377,823 B1 *  4/2002  Higuchi ............... G08B 3/1041
                                                 455/567
6,411,198 B1 *  6/2002  Hirai ................. H04M 3/42051
                                                  340/7.2
(Continued)

FOREIGN PATENT DOCUMENTS

CN      104104779 A     10/2014
CN      107094280 A      8/2017

OTHER PUBLICATIONS

"3 Methods on How to Create a Group Chat on iPhone", ezTalks, May 17, 2017, 6 pages.
(Continued)

*Primary Examiner* — Hai V Nguyen
(74) *Attorney, Agent, or Firm* — Tutunjian & Bitetto, P.C.; Kurt Goudy (57) ABSTRACT

Initiating a communication group of devices using device vibration includes encoding a message into a vibration signal using an encoder in a master device, the message including a connection request. A vibration pattern is emitted using a vibration motor by controlling the vibration motor to vibrate with a pattern corresponding to modulations of the vibration signal to send the message through a medium in contact with the master device. A response vibration pattern is received from responding devices using a sensor, the response vibration pattern carrying a response message. The response vibration pattern is decoded with a decoder of the master device to extract the response message from the response vibration pattern. A communication group is established at a host according to the response message for communication between the master device and the responding devices.

17 Claims, 8 Drawing Sheets

US 10,834,543 B2
Page 2

(51) Int. Cl.
  *G06Q 50/00* (2012.01)
  *H04W 12/04* (2009.01)
  *B06B 1/02* (2006.01)
  *H04W 8/00* (2009.01)
  *H04B 11/00* (2006.01)
  *H04L 12/18* (2006.01)

(52) U.S. Cl.
  CPC .... *H04L 12/1822* (2013.01); *H04M 1/72519* (2013.01); *H04W 8/005* (2013.01); *H04W 12/04031* (2019.01)

(58) Field of Classification Search
  USPC .................................................. 455/518, 519
  See application file for complete search history.

(56) References Cited

U.S. PATENT DOCUMENTS

| | | | |
|---|---|---|---|
| 6,690,955 B1 * | 2/2004 | Komiyama | H04M 1/576 345/158 |
| 6,785,563 B2 * | 8/2004 | Tsukamoto | H04M 1/72519 455/567 |
| 6,850,782 B2 * | 2/2005 | Bright | G06F 3/016 340/7.6 |
| 7,136,894 B2 * | 11/2006 | Britt, Jr. | H04L 65/605 709/201 |
| 7,159,008 B1 * | 1/2007 | Wies | G06F 3/01 709/206 |
| 7,183,481 B2 * | 2/2007 | Hales | G10H 1/0008 84/477 R |
| 7,779,166 B2 * | 8/2010 | Grant | H04M 1/72544 710/5 |
| 7,835,771 B2 * | 11/2010 | Jauk | H04M 1/72547 455/567 |
| 8,077,019 B2 * | 12/2011 | Hofmann | H04M 19/04 340/407.1 |
| 8,116,724 B2 * | 2/2012 | Peabody | H04M 11/04 455/404.2 |
| 8,180,051 B1 * | 5/2012 | O'Toole, Jr. | H04L 9/3231 380/255 |
| 8,351,991 B2 * | 1/2013 | Komiya | G06F 3/041 455/566 |
| 8,396,002 B2 * | 3/2013 | Marshall-Wilson | H04L 45/00 370/252 |
| 8,412,282 B2 * | 4/2013 | Yoon | H04M 19/041 455/567 |
| 8,451,103 B2 * | 5/2013 | Hwang | H04M 19/047 340/407.1 |
| 8,536,992 B2 * | 9/2013 | Oh | H04M 19/04 340/384.7 |
| 8,591,302 B2 * | 11/2013 | Raichman | A63F 13/12 463/1 |
| 8,634,815 B2 * | 1/2014 | Chu | H04L 63/101 455/416 |
| 8,667,403 B2 | 3/2014 | Kwon et al. | |
| 8,713,117 B2 | 4/2014 | Downes et al. | |
| 8,719,952 B1 * | 5/2014 | Damm-Goossens | H04L 9/0897 726/28 |
| 8,739,260 B1 * | 5/2014 | Damm-Goossens | H04L 9/3213 726/7 |
| 9,014,661 B2 * | 4/2015 | deCharms | H04L 65/1069 455/404.2 |
| 9,055,415 B2 * | 6/2015 | Toksvig | H04W 76/45 |
| 9,088,281 B2 * | 7/2015 | Kohtz | G06F 3/0346 |
| 9,226,119 B2 * | 12/2015 | Suryavanshi | H04W 12/06 |
| 9,239,949 B2 * | 1/2016 | Jung | H04L 12/1827 |
| 9,245,396 B2 * | 1/2016 | Delong | G07C 5/085 |
| 9,294,429 B2 * | 3/2016 | Hahm | H04W 4/021 |
| 9,412,000 B1 * | 8/2016 | Ge | G06T 7/70 |
| 9,454,915 B2 * | 9/2016 | Aldossary | G08B 6/00 |
| 9,467,542 B1 * | 10/2016 | Messenger | H04M 15/70 |
| 9,544,180 B2 * | 1/2017 | Neelakantan | H04L 51/28 |
| 9,576,364 B1 * | 2/2017 | Ge | G06T 7/73 |
| 9,626,845 B2 * | 4/2017 | Eagleman | A61F 11/045 |
| 9,715,797 B2 * | 7/2017 | Sim | G08B 6/00 |
| 9,762,719 B2 * | 9/2017 | Tartz | G06F 3/016 |
| 9,785,238 B2 * | 10/2017 | Birnbaum | G06F 3/04886 |
| 9,818,315 B2 * | 11/2017 | Hiltunen | H04L 9/0877 |
| 9,820,120 B2 * | 11/2017 | deCharms | H04W 4/029 |
| 9,852,336 B2 * | 12/2017 | Ge | H04N 5/23238 |
| 9,894,027 B2 * | 2/2018 | Kim | H04L 51/24 |
| 9,913,988 B2 * | 3/2018 | Yoder | G16H 40/63 |
| 10,019,912 B2 * | 7/2018 | Eagleman | G08B 6/00 |
| 10,057,260 B2 * | 8/2018 | Dunne | H04L 63/0876 |
| 10,069,825 B2 * | 9/2018 | Dunne | H04L 63/102 |
| 10,086,208 B2 * | 10/2018 | Hoffman | A61N 1/37254 |
| 10,217,381 B2 * | 2/2019 | Hiltunen | G09C 1/00 |
| 10,234,934 B2 * | 3/2019 | Connor | A41D 13/1281 |
| 10,248,203 B2 * | 4/2019 | Birnbaum | H04M 19/047 |
| 10,325,087 B1 * | 6/2019 | Goodsitt | G06F 21/36 |
| 2004/0001553 A1 * | 1/2004 | Steentra | H04L 27/2647 375/260 |
| 2004/0123727 A1 * | 7/2004 | Hales | G10H 1/0008 84/645 |
| 2004/0189484 A1 * | 9/2004 | Li | H04M 1/72552 340/4.12 |
| 2005/0107075 A1 * | 5/2005 | Snyder | H04M 19/041 455/418 |
| 2005/0183036 A1 * | 8/2005 | Torii | G06F 3/0233 715/825 |
| 2006/0066569 A1 * | 3/2006 | Eid | G06F 3/016 345/156 |
| 2006/0279476 A1 * | 12/2006 | Obata | H04M 1/72547 345/2.3 |
| 2007/0032229 A1 * | 2/2007 | Jones | G06Q 30/02 455/419 |
| 2007/0127669 A1 | 6/2007 | Shields | |
| 2007/0137462 A1 * | 6/2007 | Barros | G10H 1/0058 84/453 |
| 2007/0165019 A1 * | 7/2007 | Hale | G06Q 10/00 345/418 |
| 2007/0176742 A1 * | 8/2007 | Hofmann | H04M 19/044 340/7.6 |
| 2007/0201376 A1 * | 8/2007 | Marshall-Wilson | H04W 4/08 370/252 |
| 2008/0153554 A1 * | 6/2008 | Yoon | H04M 19/041 455/567 |
| 2009/0061825 A1 * | 3/2009 | Neelakantan | H04L 61/2069 455/412.1 |
| 2009/0189348 A1 * | 7/2009 | Kucharski | A63F 3/00 273/288 |
| 2009/0228073 A1 * | 9/2009 | Scholten | A61B 5/0031 607/60 |
| 2009/0293109 A1 * | 11/2009 | Chu | H04L 63/101 726/6 |
| 2010/0001849 A1 * | 1/2010 | Lee | G06F 3/046 340/407.2 |
| 2010/0144395 A1 * | 6/2010 | Komiya | H04M 1/72594 455/566 |
| 2010/0148942 A1 * | 6/2010 | Oh | G10L 21/06 340/407.1 |
| 2010/0161758 A1 * | 6/2010 | Tofigh | H04L 67/06 709/218 |
| 2010/0218249 A1 * | 8/2010 | Wilson | H04W 12/0608 726/19 |
| 2010/0240345 A1 * | 9/2010 | Karrman | H04M 1/7253 455/414.1 |
| 2010/0319052 A1 * | 12/2010 | Ferren | H04L 67/306 726/3 |
| 2011/0009175 A1 * | 1/2011 | Raichman | A63H 3/36 463/1 |
| 2011/0155030 A1 * | 6/2011 | Goldman | A01C 7/08 111/170 |
| 2011/0172743 A1 * | 7/2011 | Davis | A61N 1/36535 607/62 |
| 2011/0218953 A1 * | 9/2011 | Hale | G06Q 10/00 706/46 |

(56) References Cited

U.S. PATENT DOCUMENTS

| | | | | |
|---|---|---|---|---|
| 2011/0267985 | A1* | 11/2011 | Wilkinson | H04M 1/2745 370/259 |
| 2012/0051187 | A1* | 3/2012 | Paulson | H04B 11/00 367/135 |
| 2012/0072211 | A1* | 3/2012 | Edgington | G10L 15/04 704/231 |
| 2012/0134238 | A1* | 5/2012 | Surprenant | H04S 1/007 367/137 |
| 2012/0135751 | A1* | 5/2012 | Mishra | H04W 4/029 455/456.1 |
| 2012/0166077 | A1* | 6/2012 | Herzog | G06F 3/016 701/425 |
| 2012/0197347 | A1* | 8/2012 | Olson | H02J 50/10 607/60 |
| 2012/0202428 | A1 | 8/2012 | Mirbaha et al. | |
| 2012/0204887 | A1* | 8/2012 | Connor | A61F 5/56 128/848 |
| 2013/0010979 | A1* | 1/2013 | Takara | G10L 19/093 381/77 |
| 2013/0234824 | A1* | 9/2013 | Lozovsky | H04B 11/00 340/4.3 |
| 2013/0275881 | A1* | 10/2013 | Hahm | H04L 51/20 715/752 |
| 2013/0293494 | A1* | 11/2013 | Reshef | G06F 3/041 345/173 |
| 2014/0049120 | A1* | 2/2014 | Kohtz | G06F 3/016 307/117 |
| 2014/0187320 | A1* | 7/2014 | Raichman | H04N 21/4126 463/31 |
| 2014/0220940 | A1* | 8/2014 | Baisuck | H04W 4/12 455/412.1 |
| 2014/0321641 | A1* | 10/2014 | Khosravi | H04W 12/003 380/44 |
| 2014/0359272 | A1* | 12/2014 | Hiltunen | G09C 1/00 713/150 |
| 2014/0368601 | A1* | 12/2014 | deCharms | H04L 65/403 348/14.02 |
| 2015/0085619 | A1* | 3/2015 | Jeong | G08C 23/02 367/198 |
| 2015/0127737 | A1* | 5/2015 | Thompson | H04W 4/21 709/204 |
| 2015/0141005 | A1* | 5/2015 | Suryavanshi | H04W 12/08 455/434 |
| 2015/0168538 | A1* | 6/2015 | Bradley | G01S 5/18 367/127 |
| 2015/0174000 | A1* | 6/2015 | Barasch | A61H 23/004 600/38 |
| 2015/0195692 | A1* | 7/2015 | Chow | H04M 19/04 455/414.1 |
| 2015/0200880 | A1* | 7/2015 | Kunstek | H04L 51/02 715/752 |
| 2015/0237190 | A1 | 8/2015 | Yeon et al. | |
| 2016/0012688 | A1* | 1/2016 | Eagleman | A61F 11/04 340/407.1 |
| 2016/0055726 | A1* | 2/2016 | Aldossary | G01C 21/3652 340/407.1 |
| 2016/0058658 | A1* | 3/2016 | Borras | H04W 68/005 601/46 |
| 2016/0182170 | A1* | 6/2016 | Daoura | H04W 12/0013 455/3.01 |
| 2016/0192166 | A1* | 6/2016 | deCharms | H04L 67/18 348/14.02 |
| 2016/0202755 | A1* | 7/2016 | Connor | A61B 5/1126 73/865.4 |
| 2016/0250486 | A1* | 9/2016 | Yoder | G06F 19/00 340/870.07 |
| 2016/0250490 | A1* | 9/2016 | Hoffman | A61N 1/37254 607/60 |
| 2016/0322078 | A1* | 11/2016 | Bose | A63F 13/217 |
| 2017/0053560 | A1* | 2/2017 | Aldossary | H04M 19/047 |
| 2017/0061116 | A1* | 3/2017 | Dunne | G06F 21/78 |
| 2017/0063819 | A1* | 3/2017 | Dunne | H04L 63/08 |
| 2017/0099364 | A1* | 4/2017 | Boing-Messing | G06Q 10/06 |
| 2017/0154217 | A1* | 6/2017 | Ge | G06T 7/30 |
| 2017/0155572 | A1* | 6/2017 | Ge | G06K 9/52 |
| 2017/0173262 | A1* | 6/2017 | Veltz | G16H 20/17 |
| 2017/0178539 | A1* | 6/2017 | Eagleman | A61F 11/04 |
| 2017/0180149 | A1* | 6/2017 | McConnell | H05B 47/19 |
| 2017/0228710 | A1* | 8/2017 | Lee | G06Q 20/322 |
| 2017/0251347 | A1* | 8/2017 | Mehta | H04W 4/08 |
| 2018/0047306 | A1* | 2/2018 | Hiltunen | G09C 1/00 |
| 2018/0054720 | A1* | 2/2018 | Messenger | H04M 3/53333 |
| 2018/0078843 | A1* | 3/2018 | Tran | A61B 5/6895 |
| 2018/0098134 | A1* | 4/2018 | Sufuentes | G11B 27/031 |
| 2018/0167098 | A1* | 6/2018 | Armstrong | G01H 1/04 |
| 2018/0211509 | A1* | 7/2018 | Ramaci | G08B 21/24 |
| 2018/0255007 | A1* | 9/2018 | Ji | H04L 51/063 |
| 2018/0255013 | A1* | 9/2018 | Dunne | H04L 51/24 |
| 2018/0255014 | A1* | 9/2018 | Dunne | H04L 51/24 |
| 2018/0309801 | A1* | 10/2018 | Rathod | H04L 67/141 |
| 2018/0350264 | A1* | 12/2018 | Dhar | G09B 21/003 |
| 2019/0007405 | A1* | 1/2019 | Dunne | G06F 12/1416 |
| 2019/0019090 | A1* | 1/2019 | Chacko | G06Q 10/107 |
| 2019/0030349 | A1* | 1/2019 | Hoffman | A61N 1/37252 |
| 2019/0164455 | A1* | 5/2019 | Hiltunen | H04W 12/04 |
| 2019/0180409 | A1* | 6/2019 | Moloney | G06N 3/0454 |
| 2019/0196588 | A1* | 6/2019 | Friedman | G06Q 20/12 |
| 2019/0200221 | A1* | 6/2019 | Todasco | G06F 21/445 |
| 2019/0215162 | A1* | 7/2019 | Dickenson | H04W 4/029 |
| 2019/0261313 | A1* | 8/2019 | Borras | H04W 68/005 |
| 2019/0312736 | A1* | 10/2019 | Dickenson | H04W 4/029 |
| 2020/0036451 | A1* | 1/2020 | Gilson | H04M 1/72577 |

OTHER PUBLICATIONS

Van Grove, "Create an Instant SMS Chatroom on Your Phone", Mashable, Oct. 15, 2010, 3 pages.

* cited by examiner

CREATING A SOCIAL GROUP WITH MOBILE PHONE VIBRATION

BACKGROUND

Technical Field

The present invention generally relates to mobile communications, and more particularly to creating a social group with mobile phone vibration.

Description of the Related Art

Social networking can facilitate interpersonal communication and relationships. Thus, users receive great benefit from social tools and communication solutions provided by technology such as, e.g., smartphones, tablets, computers and other mobile devices. Group chat tools, for example, help people to interact with a group of people more easily. However, users often must know contact information or be connected with those in the group chat before joining the group. Obtaining this information and performing steps to virtually connect with other users introduces inconveniences, inefficiencies and security concerns.

SUMMARY

In accordance with an embodiment of the present invention, a method for initiating a communication group of devices using device vibration is presented. The method includes encoding a message into a vibration signal using an encoder in a master device, the message including a connection request. A vibration pattern is emitted using a vibration motor by controlling the vibration motor to vibrate with a pattern corresponding to modulations of the vibration signal to send the message through a medium in contact with the master device. A response vibration pattern is received from responding devices using a sensor, the response vibration pattern carrying a response message. The response vibration pattern is decoded with a decoder of the master device to extract the response message from the response vibration pattern. A communication group is established at a host according to the response message for communication between the master device and the responding devices.

In accordance with another embodiment of the present invention, a method for initiating a communication group of devices using device vibration is presented. The method includes encoding a message into a vibration signal using an encoder in a master device, the message including a connection request and a request key. A vibration pattern is emitted using a vibration motor by controlling the vibration motor to vibrate with a pattern corresponding to modulations of the vibration signal to send the message through a medium in contact with the master device. A response vibration pattern is received from responding devices in contact with the medium using a sensor, the response vibration pattern carrying a response message including an acknowledgment key. The response vibration pattern is decoded with a decoder of the master device to extract the response message from the response vibration pattern. The request key and the acknowledgment key are compared to determine a match. The responding devices are authorized according to the match. A communication group is established at a host according to the response message for communication between the master device and the responding devices.

In accordance with an embodiment of the present invention, a device for initiating a communication group of devices using device vibration is presented. The device includes an encoder that encodes a message into a vibration signal, the message including a connection request. A vibration motor emits a vibration pattern by controlling the vibration motor to vibrate with a pattern corresponding to modulations of the vibration signal to send the message through a medium in contact with the master device. A sensor receives a response vibration pattern from responding devices, the response vibration pattern carrying a response message. A decoder decodes the response vibration pattern to extract the response message from the response vibration pattern. A host establishes a communication group according to the response message for communication between the master device and the responding devices.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

According to an embodiment of the present invention, a social network, such as, e.g., a group chat, is initiated amongst a group of users using a vibratory signal emitted from a master device to establish connections with other devices.

To establish the connection, the master device generates a message and encodes the message as a signal carried by vibrations. Because devices can include vibration motors, a controller is implemented to control the vibration motor to create a vibration pattern that signifies the encoded message.

For example, the vibration pattern can include modulation of frequency and amplitude of vibrations created by the vibration motor.

By placing both the master device as well as the other devices on a common medium, such as, e.g., a table top, the vibrations from the master device can be carried through the common medium to effect the other devices. Using sensors in the other devices, such as, e.g., accelerometers, gyroscopes and microphones, the other devices can receive the vibration pattern to discern, e.g., the modulation of frequency and amplitude. Thus, each of the other devices decodes the pattern to receive the messages. The messages can include a connection request.

In response to the connection request, the other devices can respond to the master device using vibration patterns to send a response message including an acknowledgement and a device identification (ID). The device ID can be used by the master device to generate a group including each of the other devices that responded with the acknowledgement. Thus, a group of devices can be put in communication with one another using the vibration patterns. As a result, a group chat can be initiated without an exchange of contact information or extra steps on the user's part. Thus, the group chat is initiated more quickly, more conveniently and more safely.

Exemplary applications/uses to which the present invention can be applied include, but are not limited to: device communications including messaging, file sharing or other communication, and social networking including cloud hosting of device communication groups.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
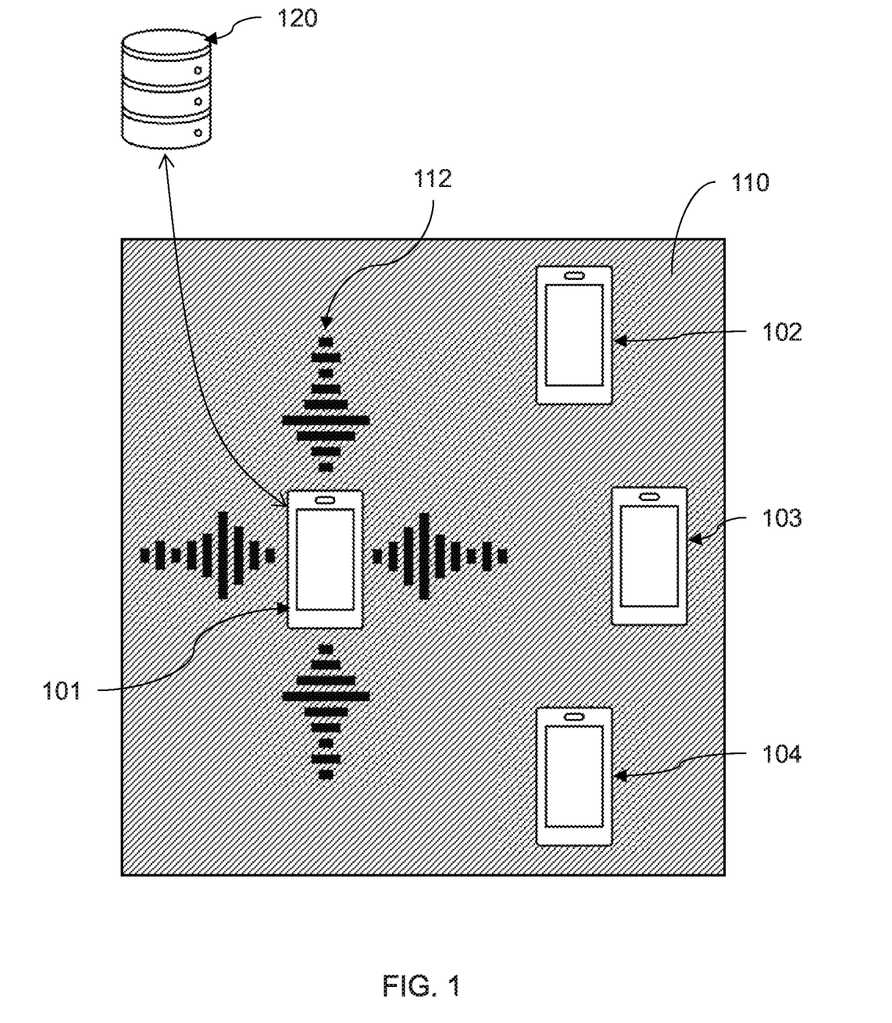
FIG. 1 is a diagram showing a system for creating a social group using mobile device vibrations, in accordance with an embodiment of the present invention.

Referring now to the drawings in which like numerals represent the same or similar elements and initially to FIG. 1, a diagram showing a system for creating a social group using mobile device vibrations is depicted according to an embodiment of the present invention.

According to aspects of the present invention, a user can control a master device 101 to establish a group chat in a host 120 with a group of mobile devices 102, 103 and 104. The master device 101 can be placed on a medium that transfers a vibratory signal. For example, the master device 101 can be placed on a table 110 made of, e.g., wood, metal, plastic, stone, or other solid material. However, other mediums are possible, such as, e.g., liquids or through a gaseous medium such as air.

To form the group chat, the master device 101 can communicate with the host 120. The host 120 can include, e.g., a server, a cloud network, or any other remote or locally attached computing device. Alternatively, the host 120 can be a storage and a processing device within the master device 101 itself. Thus, the master device 101 can generate a request to the host 120 to establish a set of resources to facilitate inter-device communications, such as, e.g., transfers of messages. Once established, the host 120 can provide a chat room identification to permit other devices to recognize the group chat. The chat room identification is provided to the master device 101.

The master device 101 generates a request to other devices to join the group chat of the host 120 by connecting with host 120 via the chat room identification. However, to prevent unauthorized access to the host 120, the request can include a request key. Using the request key, the master device 101 and the host 120 can verify that the accessing device is attempting a connection according to the master device 101 invitation. Moreover, security of the host 120 can be further facilitated by including an identification request from another device. The identification request can prompt the other device to respond with a device identification.

According to an embodiment of the present invention, the host 120 can be established on a network, such as, e.g., the internet, an intranet, or some other network based connection. Therefore, establishing a chat room identification and a device identification facilitates two-way verification between the host 120 and the other device. Additionally, either the host 120 can establish a connection with other device using the device identification, or the other device can establish a connection with the host 120 using the chat room identification. Alternatively, only one of the identifications could be used such that the identified device or host 120 can be sent a connection request.

The master device 101 encodes the request into a vibration pattern. Encoding the request can include encoding information across a combination of frequency and amplitude, however, other encoding methods can be utilized. The vibration pattern can then be emitted by the master device 101 as a vibration signal 112. The vibration signal 112 can be produced from, e.g., a vibration motor of the master device 101, and emitted omnidirectionally from the master device 101 through the medium 110. The vibration signal 112 carries the request to nearby devices.

Other devices, such as, a first device 102, a second device 103 and a third device 104 can receive the vibration signal 112 through the medium 110. The other devices 102, 103 and 104 can be instructed by a user to listen for vibration signals 112 via, e.g., an application, or the other devices 102, 103 and 104 can automatically detect vibration signals 112. In any case, the other devices 102, 103 and 104 can detect the vibration signal 112 using a sensor, such as, e.g., a microphone, an accelerometer, a gyroscope, or other sensor for detecting vibration.

The detected vibration signal 112 can be decoded by each of the first, second and third devices 102, 103 and 104, respectively. Upon decoding the vibration signal 112, the other devices 102, 103 and 104 can determine the request produced by the master device 101 and produce a response signal. The response signal can include, e.g., an acknowledgement key matching the request key according to e.g., a key-share protocol, or other protocol to verify the communication. Additionally, the response signal can include a device identification, such as, e.g., a phone number, internet protocol (IP) address, or other identification for forming a connection across a network.

The response signal can be encoded in a vibration pattern to be communicated back to the master device 101 via a response vibration signal. The master device 101 can received and decode the response vibration signal in a similar manner to the receiving and decoding of the vibration signal 112 by the other devices 102, 103 and 104. Upon receiving matching acknowledgement keys from the other devices 102, 103 and 104, the master device 101 initiates a connection between the host 120 and each of the devices 102, 103 and 104 using the device identification, chat room identification, or both. According to one possible embodiment, the master device 101 provides each device identification to the host 120. The host 120 can then send a communication request to each of the responding devices, 102, 103 and 104 using the device identifications. Thus, a connection sequence can be initiated and the devices 102, 103 and 104 can be added to the group chat with the master device 101.

Figure 2:
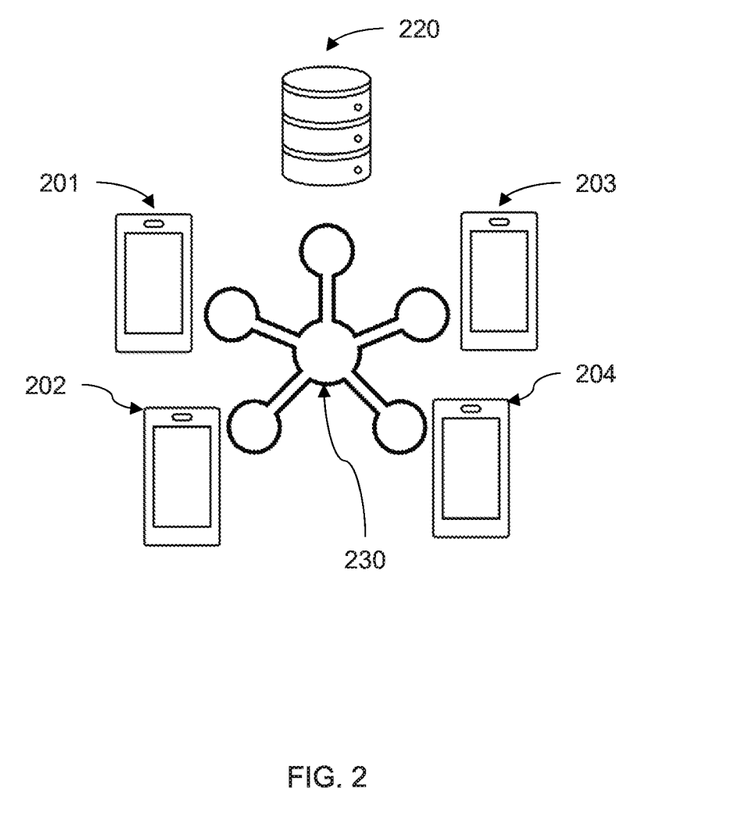
FIG. 2 is a diagram showing a temporary group of devices established with mobile device vibrations, in accordance with an embodiment of the present invention.

Referring now to FIG. 2, a diagram showing a temporary group of devices established with mobile device vibrations is depicted according to an embodiment of the present invention.

According to an embodiment of the present invention, a chat network 230, such as the group chat described above, can bring mobile devices 201-204 into communication with a host 220. The host 220 can be, e.g., a server, cloud environment, local processing device within, e.g., a master device such as device 201, or other remote or local computing device.

The host 220 hosts communication between each of the mobile device 201-204. Using a chat room identification (ID), the mobile device 201-204 can send a communication to each other mobile device 201-204 by addressing the communication to the host 220 via the chat room ID. Based on the chat room ID, the host 220 can then pass along the communication to each mobile device 201-204 such that the communication is visible and accessible to all of the mobile devices 201-204. The host 220 can pass the communication along using device identifications (IDs). Accordingly, the host 220 can maintain a record of active members of the chat room according to device IDs, e.g., in a storage device or memory device. As a result, the host 220 can ensure that each member is receiving the communications and no unauthorized members receive the communications.

Figure 3:
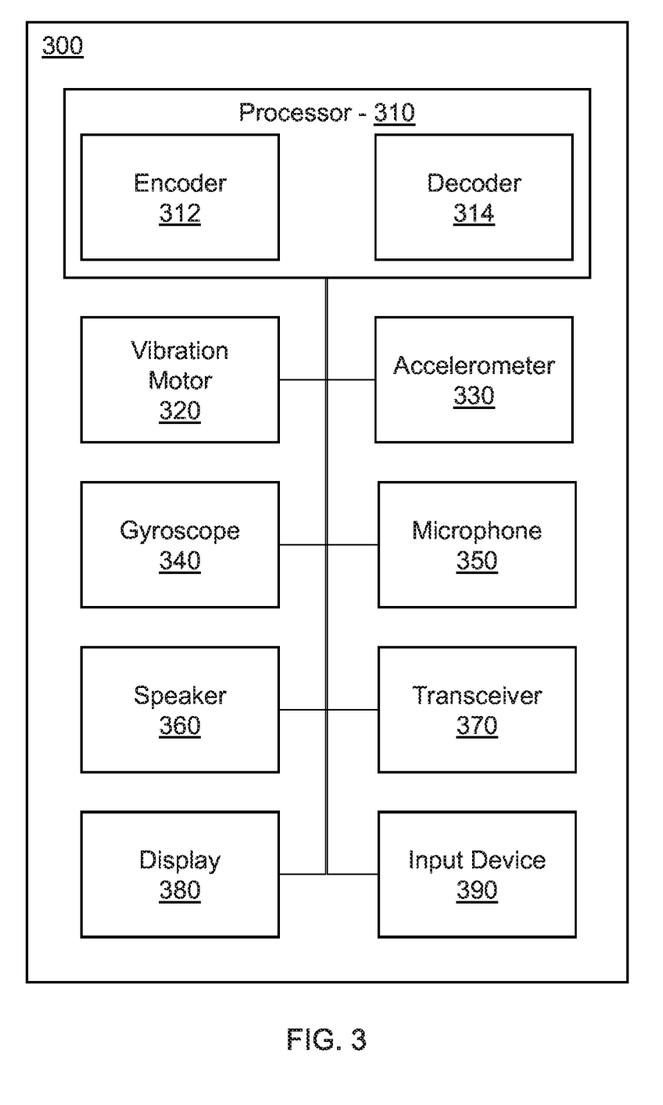
FIG. 3 is a diagram showing a mobile device for sending and receiving messages by vibration patterns, in accordance with an embodiment of the present invention.

Referring now to FIG. 3, a diagram showing a mobile device for sending and receiving messages by vibration patterns is depicted according to an embodiment of the present invention.

According to an embodiment of the present invention, a mobile device 300 is designed for establishing a social group using device vibration. As such, the mobile device 300 includes a processor 310 including an encoder 312 and decoder 314 for encoding and decoding communications, respectively.

A message, such as, e.g., connection request can be generated with the processor 310 upon input from a user using the input device 390. The input device 390 can include, e.g., a capacitive or resistive layer of a screen to form a touchscreen, or a keyboard, mouse, or other hardware or virtual input method. Additionally, the input device 390 and the display 380 can be separate devices, or can be combined into a single component, such as, e.g., a touchscreen display, having a display 380 part and a touch sensitive layer as an input device 390 part. The input can cause the processor 310 to generate the message and encode the message with the encoder 312. The message can then be sent, via a transceiver 370, to a desired recipient.

Response messages can be received by the transceiver 370 and decoded with the decoder 314. As a result, the response message can be displayed to the user using the display 380. For example, a message sent via a group chat can be received from a chat room host by the chat room host addressing the message to an ID of the mobile device 300. The mobile device 300 can determine the source of the message according to a chat room ID attached to the message, as well as, e.g., a device ID corresponding to the originating device. The contents of the message can then be displayed to the user via the display 380, including information regarding the source device as well as the chat room.

Alternatively or in addition, the message and response message can be direct text based communication between the users of the mobile device 300, or file transfers with the file encoded in vibration signals. Any other form of communication encodable into a vibration signal is also contemplated, including, e.g., encryption/decryption messages, file sharing, application communication, media streaming, distributed communication such as emergency alerts transferred amongst a group of device, among others. The communicated messages can be displayed to a user via the display 380 and interacted with via the input device 390.

For example, according to one possible embodiment, to join a group chat, the encoder 312 can encode a group chat request. The group chat request can be automatically generated in the processor 310, or can be generated upon request by a user via the input device 390 and/or the display 380. For example, an application can be loaded into a memory included with the processor 310 to determine a chat room host, such as, e.g., a cloud service, a server or the processor 310 with memory and storage devices of the mobile device 300. The chat room can be generated and a group chat request can be generated on-demand by a user via the input device 390 to encode the group chat request including, e.g., a request key and a chat room ID, with the encoder 312.

The encoder 312 encodes the group chat request into a pattern suitable for communication by vibrations. As such, the encoder 312 can encode the group chat request across, e.g., frequency and amplitude. Using the encoded group chat request, the processor 310 can instruct a vibration motor 320 to vibrate corresponding to the pattern produced by the encoder 312. Because the group chat request is encoded with a pattern suitable for representation by vibrations, the vibration motor 320 can be controlled to implement the pattern and emit the vibration pattern carrying the chat room request.

The mobile device 300 detects such emitted vibration patterns from other mobile devices 300 as well. The mobile device 300 includes sensors that detect the vibrations. For example, an accelerometer 330 can detect small movements of the mobile device 300 caused by the vibration pattern. A signal corresponding to the accelerometer 330 measurements can be provided to the processor 310 to be decoded by the decoder 314. Similarly, a microphone 350 can detect a sound signature caused by the vibration pattern. Thus, the microphone 350 can measure fluctuates in the sound signature to determine the vibration pattern. As signal corresponding to the sound signature can be provided to the processor 310 to be decoded by the decoder 314. A gyroscope 340 can also be used to detect the vibration pattern by measuring changes in orientation of the mobile device 300 caused by the vibrations. The gyroscope 340 can measure the orientation changes as a way to determine the vibration pattern. A signal corresponding to the measurements can then be provided to the processor 310 to be decoded with the decoder 314. The vibration pattern can be detected and measured by any one, or combination of the above described sensors, or any other sensor suitable for detecting the vibration pattern.

The decoder 314 can receive the signal corresponding to the vibration pattern and decode the signal to reproduce the group chat request. Accordingly, the mobile device 300 can process the group chat request and notify a user of the request via, e.g., the display 380 or a speaker 360. The user can then choose to either accept or deny the request, such as, e.g., by making a selection via the input device 390. Alternatively, the mobile device 300 can automatically accept the request.

Upon acceptance, the mobile device 300 can generate a group chat acknowledgment. The group chat acknowledgement can include an acknowledgement key matching the request key of the group chat request. By using a matching key, the acknowledgment can be verified and associated with a particular group chat and chat room hosted by the host.

The acknowledgement can be encoded with the encoder 312 in a process similar to the encoding of the request message, described above. Similarly, the processor 310 controls the vibration motor 320 according to the vibration pattern corresponding to the encoded acknowledgement. Thus, the mobile device 300 can reply to a group chat request by emitting vibrations carrying an acknowledgment.

Accordingly, the mobile device 300 can both send and receive vibration-carried communications by encoding to, and decoding from, a vibration pattern. Thus, chat groups can be formed with other devices in the proximity of the mobile device 300 by sharing chat group requests and acknowledgments with vibratory communications.

Figure 4:
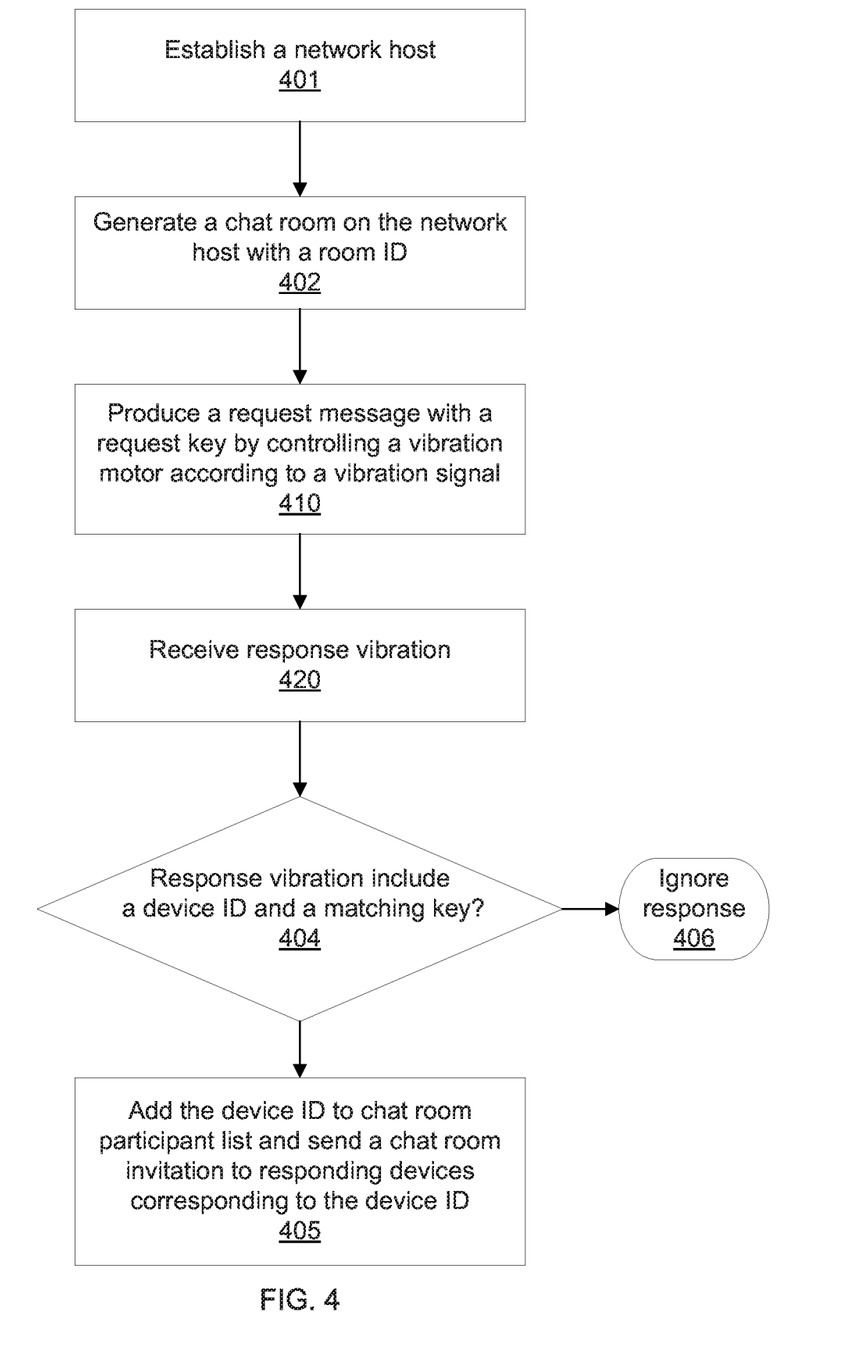
FIG. 4 is a block/flow diagram showing a system/method creating a social group using mobile device vibrations, in accordance with an embodiment of the present invention.

Referring now to FIG. 4, a block/flow diagram showing a system/method creating a social group using mobile device vibrations is depicted according to an embodiment of the present invention.

According to an embodiment of the present invention, a group chat can be established on a host using a master device.

At block 401, a network host is established. The network host can include, e.g., a cloud service, a server, a local host on a master device using, e.g., a processor and memory and storage devices, or any other local or remote device suitable for relaying and storing chat messages.

At block 402, a chat room is generated on the network host with a room ID. The chat room can include a set of host resources, such as, e.g., processing time, a storage allotment, network access, or any other resources for relaying and storing chat messages. The room ID can be used to identify the chat room and communicate and connect with the chat room. Thus, the chat room can be discovered by possible participants in the group chat as a way to exchange communications.

At block 410, a request message with a request key is produced by controlling a vibration motor according to a vibration signal. The request message can include a communication to other devices to establish a connection with the chat room. The request key can be used to verify that a responding device is an authorized device that received the request message. The request message can be encoded into a pattern to be carried by vibration modulates, such as, e.g., frequency, amplitude, or other modulations to a vibration using, e.g., a vibration motor within the mobile device.

At block 420, a response vibration can be received from a responding device. The response vibration can come in the form of a message encoded into a vibration pattern, similar to the request message. The response vibration can be verified according to, e.g., a matching acknowledgment key.

At block 404, it is determined whether the response vibration includes a device ID and a matching key. The device ID is an identifier that identifies the responding device such that communications can be addressed to the responding device. However, other information can be used that provides a suitable communication method. As described above, the matching key is a key in the response vibration that matches the request key. If the response key does not match the request key, then the responding device is an unauthorized device or the vibration detected does not correspond to a response message. As a result, the response is ignored at block 406.

Where the response vibration includes both a device ID and a matching key, the device ID is added to a chat room participate list and a chat room invitation is sent to responding devices corresponding to the device ID at block 405. Because the response vibration indicates an authorized group chat participant device, the host is notified of the participant device such that the host receives communications addressed to the chat room. As such, the host can maintain a record of authorized participant devices in, e.g., a memory or storage device. The device ID also provides the host an address to which group chats can be sent from other participant devices. However, the responding device can decline to join the chat room upon receipt of the chat room invitation by, e.g., a user selecting an option to decline the connection.

The chat room invitation can be sent via a vibration method as described above with respect to the request vibration. However, the chat room invitation can alternatively, be a communication from the host via a wired or wireless connection.

Figure 5:
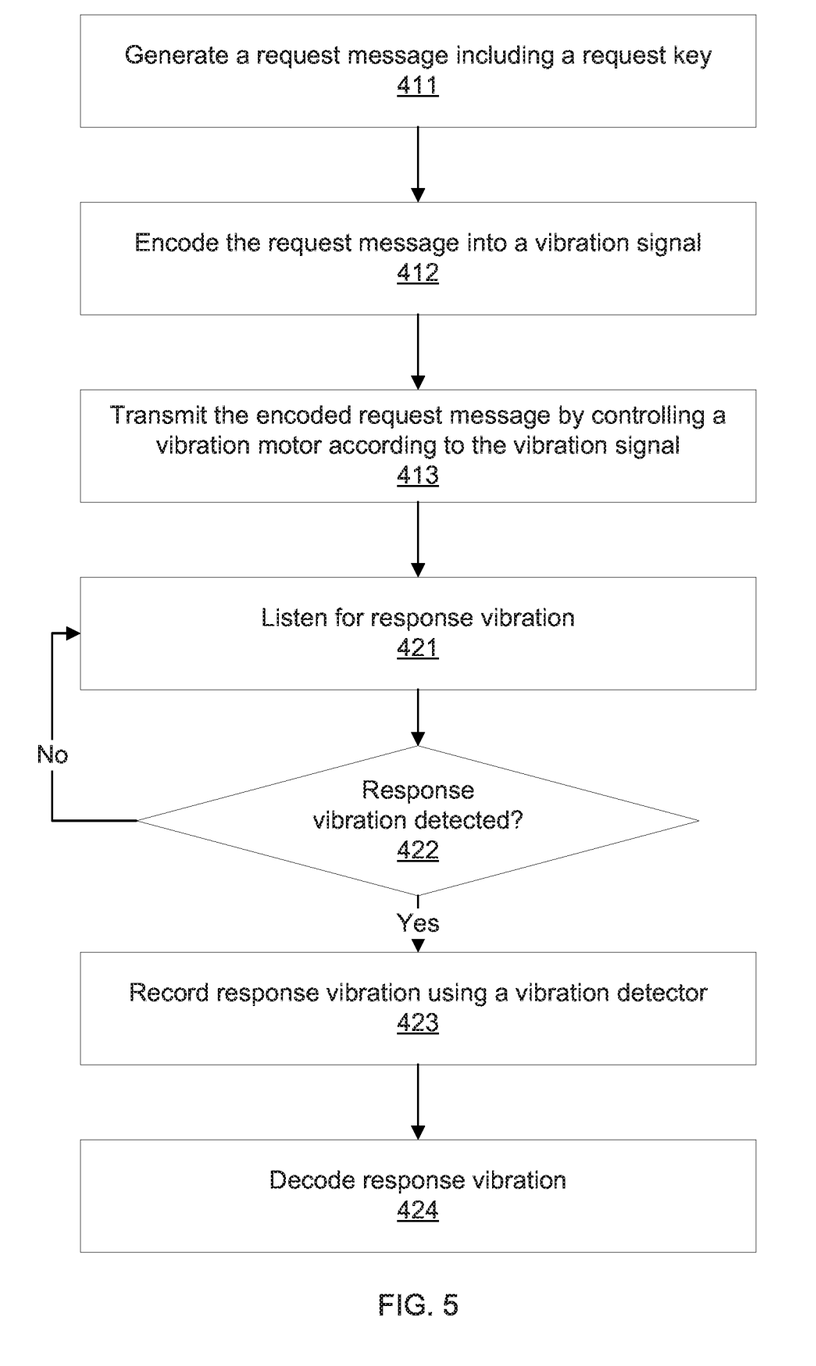
FIG. 5 is a block/flow diagram showing a system/method for sending and receiving a message at a master device using vibrations to establish a group chat, in accordance with an embodiment of the present invention.

Referring now to FIG. 5, a block/flow diagram showing a system/method for sending and receiving a message at a master device using vibrations to establish a group chat is depicted according to an embodiment of the present invention.

According to aspects of the present invention, a request message with a request key is produced by controlling a vibration motor according to a vibration signal.

As such, at block 411, a request message is generated including a request key.

At block 412, the request message is encoded into a vibration signal, using, e.g., frequency modulation, amplitude modulation, or other modulation of a vibration signal.

At block 413, the encoded request message is transmitted by controlling a vibration motor according to the vibration signal.

To receive a response vibration, upon transmitting the encoded request message, a response vibration is listened for at block 421.

At block 422, a vibration can be determined to be a response vibration. If the detected vibration is not the detection of a response vibration, then listening is continued, as at block 421.

At block 423, upon detection of a response vibration, the response vibration is recorded using a vibration detector. The vibration detector can be, e.g., a sensor on a mobile device, such as, e.g., an accelerometer, a gyroscope, a microphone, or other sensor and combinations thereof.

At block 424, the response vibration is decoded, such as, e.g., by decoding a message according to vibration modulation, such as, e.g., frequency, amplitude or other suitable modulation.

Figure 6:
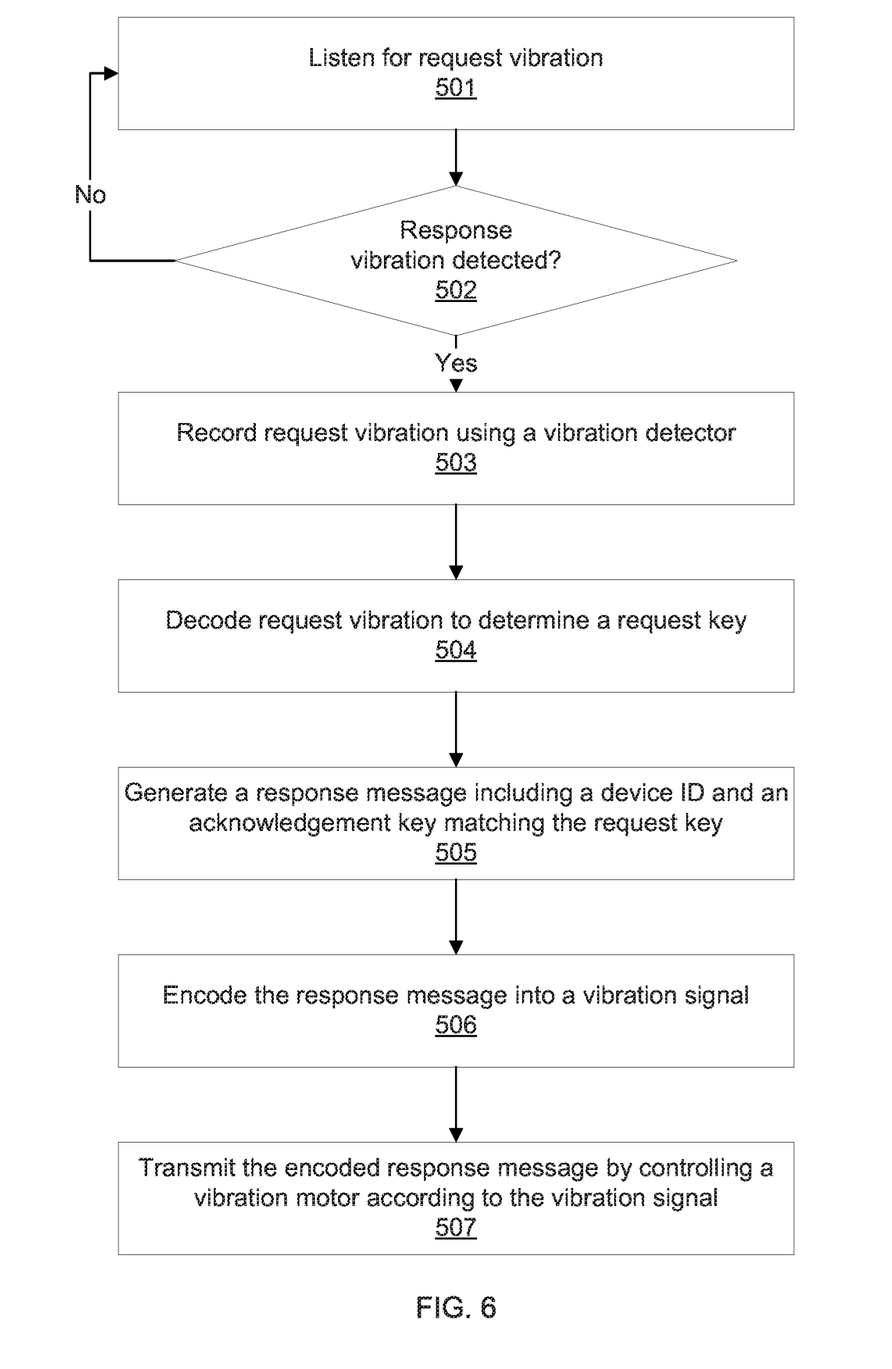
FIG. 6 is a block/flow diagram showing a system/method sending and receiving a message at a recipient device using vibrations to establish a group chat, in accordance with an embodiment of the present invention.

Referring now to FIG. 6, a block/flow diagram showing a system/method sending and receiving a message at a recipient device using vibrations to establish a group chat is depicted according to an embodiment of the present invention.

According to an embodiment of the present invention, a device can receive and respond to a chat group request.

To receive a request vibration, a vibration is listened for at block 501. A device can begin listening upon a command by a user using an input device. However, the device can also monitor sensors on a continual or periodic basis for vibration signals.

At block 502, a vibration can be determined to be a request vibration. If the detected vibration is not the detection of a request vibration, then listening is continued, as at block 501.

At block 503, upon detection of a request vibration, the request vibration is recorded using a vibration detector. The vibration detector can be, e.g., a sensor on a mobile device, such as, e.g., an accelerometer, a gyroscope, a microphone, or other sensor and combinations thereof.

At block 504, the request vibration is decoded to determine a request key, such as, e.g., by decoding a message according to vibration modulation, such as, e.g., frequency, amplitude or other suitable modulation.

As such, at block 505, a response message is generated including a device ID and an acknowledgment key matching the request key.

At block 506, the response message is encoded into a vibration signal, using, e.g., frequency modulation, amplitude modulation, or other modulation of a vibration signal.

At block 507, the encoded request message is transmitted by controlling a vibration motor according to the vibration signal.

Figure 7:
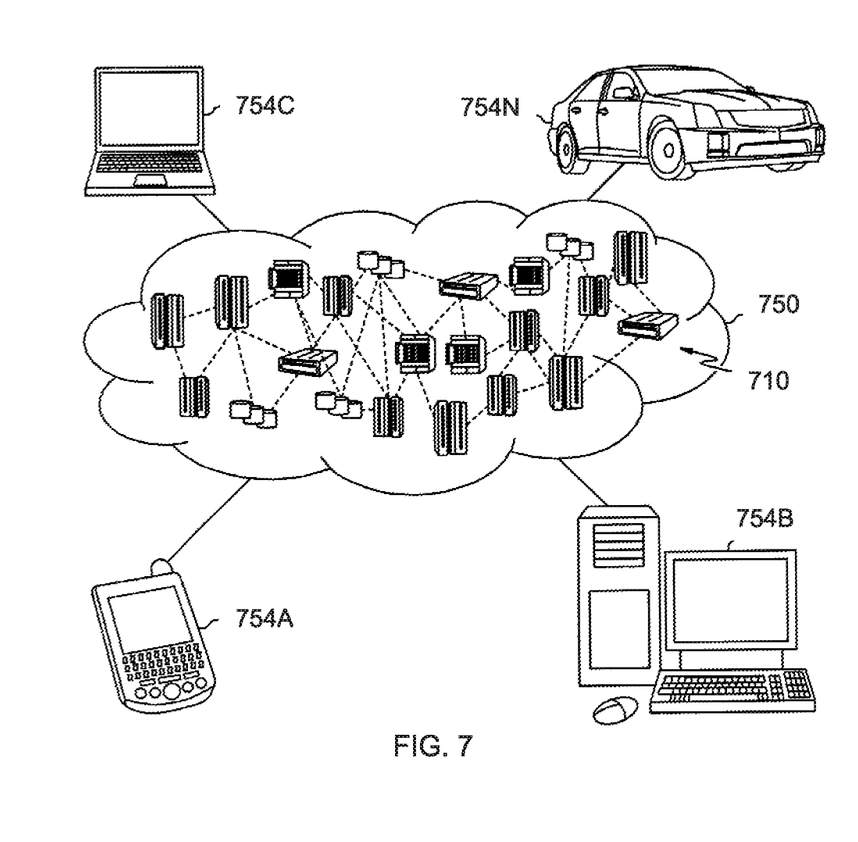
FIG. 7 is a block diagram showing an illustrative cloud computing environment having one or more cloud computing nodes with which local computing devices used by cloud consumers communicate in accordance with one embodiment.

Referring now to FIG. 7, illustrative cloud computing environment 750 is depicted according to an embodiment of the present invention.

As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
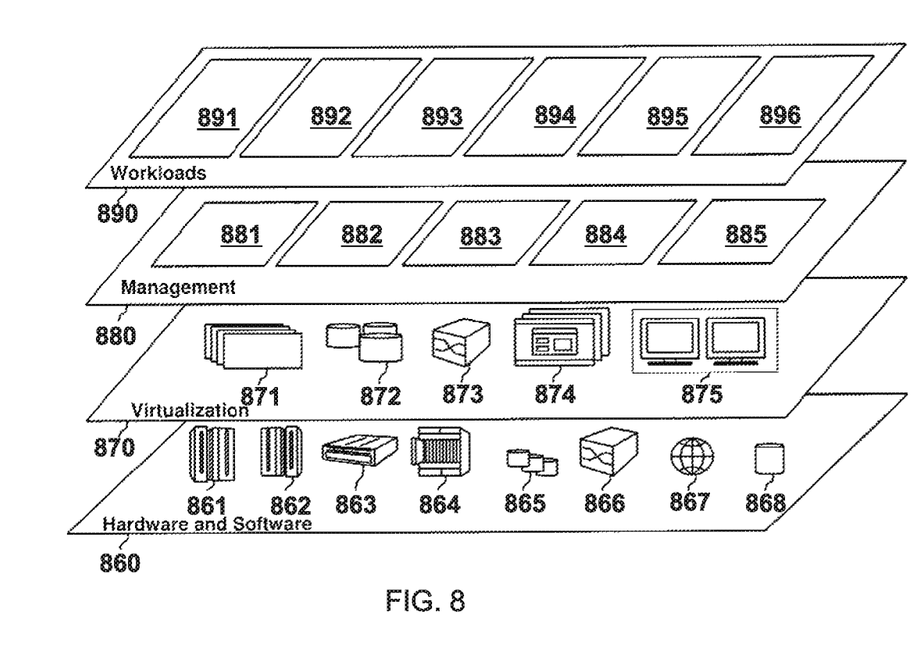
FIG. 8 is a block diagram showing a set of functional abstraction layers provided by a cloud computing environment in accordance with one embodiment.

Referring now to FIG. 8, a set of functional abstraction layers provided by cloud computing environment 750 (FIG. 7) is shown according to an embodiment of the present invention.

It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and group chat establishment 896 using vibration pattern connection requests.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for initiating a communication group of devices using device vibration, the method comprising:
   encoding a message into a vibration signal using an encoder in a master device, the message including a connection request;
   emitting a vibration pattern using a vibration motor by controlling the vibration motor to vibrate with a pattern corresponding to modulations of the vibration signal to send the message through a medium in contact with the master device;
   receiving a response vibration pattern from at least one responding device using a sensor, the response vibration pattern carrying a response message;
   decoding the response vibration pattern with a decoder of the master device to extract the response message from the response vibration pattern; and
   establishing a group chat at a host, the host being the master device, according to the response message for communication between the master device and the at least one responding device.

2. The method as recited in claim 1, wherein encoding the message into a vibration signal includes encoding the message into vibration modulations.

3. The method as recited in claim 2, wherein the vibration modulations include modulations selected from the group consisting of frequency modulation and amplitude modulation.

4. The method as recited in claim 1, further including recording the response vibration pattern by storing measurements from the sensor of the master device, the sensor being selected from the group consisting of an accelerometer, a gyroscope and a microphone.

5. The method as recited in claim 1, wherein the message further includes a request key and the response message includes an acknowledgement key.

6. The method as recited in claim 5, further including
   comparing the request key and the acknowledgement key to determine a match; and
   authorizing the at least one responding device according to the match.

7. The method as recited in claim 1, further including providing a device ID corresponding to each of the at least one responding device to the host to add each of the at least one responding device to a participant list.

8. The method as recited in claim 1, further including establishing the host in a memory of the master device.

9. A method for initiating a communication group of devices using device vibration, the method comprising:
   encoding a message into a vibration signal using an encoder in a master device, the message including a connection request and a request key;

emitting a vibration pattern using a vibration motor by controlling the vibration motor to vibrate with a pattern corresponding to modulations of the vibration signal to send the message through a medium in contact with the master device;

receiving a response vibration pattern from at least one responding device in contact with the medium using a sensor, the response vibration pattern carrying a response message including an acknowledgment key;

decoding the response vibration pattern with a decoder of the master device to extract the response message from the response vibration pattern;

comparing the request key and the acknowledgment key to determine a match;

authorizing the at least one responding device according to the match; and establishing a group chat at a host, the host being the master device according to the response message for communication between the master device and the at least one responding device.

10. The method as recited in claim 9, wherein encoding the message into a vibration signal includes encoding the message into vibration modulations.

11. The method as recited in claim 10, wherein the vibration modulations include modulations selected from the group consisting of frequency modulation and amplitude modulation.

12. The method as recited in claim 9, further including recording the response vibration pattern by storing measurements from the sensor of the master device, the sensor being selected from the group consisting of an accelerometer, a gyroscope and a microphone.

13. The method as recited in claim 9, further including providing a device ID corresponding to each of the at least one responding device to the host to add each of the at least one responding device to a participant list.

14. The method as recited in claim 9, further including establishing the host in a memory of the master device.

15. A device for initiating a communication group of devices using device vibration, the device comprising:

an encoder that encodes a message into a vibration signal, the message including a connection request;

a vibration motor that emits a vibration pattern by controlling the vibration motor to vibrate with a pattern corresponding to modulations of the vibration signal to send the message through a medium in contact with a master device;

a sensor that receives a response vibration pattern from at least one responding device, the response vibration pattern carrying a response message;

a decoder that decodes the response vibration pattern to extract the response message from the response vibration pattern; and a host, the host being the master device, that establishes a group chat according to the response message for communication between the master device and the at least one responding device.

16. The device as recited in claim 15, wherein the modulations include modulations selected from the group consisting of frequency modulation and amplitude modulation.

17. The device as recited in claim 15, further including a memory for recording the response vibration pattern by storing measurements from the sensor, the sensor being selected from the group consisting of an accelerometer, a gyroscope and a microphone.

\* \* \* \* \*